(12) United States Patent
Huang et al.

(10) Patent No.: US 8,514,181 B2
(45) Date of Patent: Aug. 20, 2013

(54) PRESSURE SENSITIVE AND LUMINOUS KEYBOARD

(75) Inventors: Bin-Hui Huang, Taipei (TW);
Chien-Ming Yang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 419 days.

(21) Appl. No.: 12/875,906

(22) Filed: Sep. 3, 2010

(65) Prior Publication Data
US 2012/0013272 A1    Jan. 19, 2012

(30) Foreign Application Priority Data

Jul. 16, 2010 (TW) .............................. 99123427 A

(51) Int. Cl.
*G09F 3/02* (2006.01)
*G01D 11/28* (2006.01)
*G09G 5/00* (2006.01)

(52) U.S. Cl.
USPC ........................................ 345/170; 362/23.03

(58) Field of Classification Search
USPC .................. 345/170; 379/433.07; 362/23.03
See application file for complete search history.

(56) References Cited

U.S. PATENT DOCUMENTS

| | | | |
|---|---|---|---|
| 5,950,810 A * | 9/1999 | Pan et al. | 200/344 |
| 8,154,521 B2 * | 4/2012 | Lim et al. | 345/170 |
| 2004/0004559 A1 * | 1/2004 | Rast | 341/34 |
| 2004/0080437 A1 * | 4/2004 | Lin | 341/26 |
| 2006/0034042 A1 * | 2/2006 | Hisano et al. | 361/681 |
| 2007/0103430 A1 * | 5/2007 | Nishi | 345/156 |
| 2009/0173610 A1 * | 7/2009 | Bronstein et al. | 200/314 |
| 2010/0148999 A1 * | 6/2010 | Casparian et al. | 341/34 |

* cited by examiner

*Primary Examiner* — Dwayne Bost
*Assistant Examiner* — Larry Sternbane
(74) *Attorney, Agent, or Firm* — Kirton McConkie; Evan R. Witt

(57) ABSTRACT

A pressure sensitive and luminous keyboard includes at least one key, a pressure detecting circuit, an illumination module and a controlling unit. When one of the plural keys is depressed in response to a first pressure, the pressure detecting circuit generates a pressure-strength sensing voltage. According to the pressure-strength sensing voltage, the controlling unit will judge the strength of the first pressure and control the illumination module to emit either the first light beam or the second light beam.

8 Claims, 10 Drawing Sheets

PRESSURE SENSITIVE AND LUMINOUS KEYBOARD

FIELD OF THE INVENTION

The present invention relates to a keyboard, and more particularly to a pressure sensitive keyboard having a pressure sensing function.

BACKGROUND OF THE INVENTION

The common input device of a computer system includes for example a mouse, a keyboard or a trackball. In particular, for most users, the keyboard becomes an indispensable input device of the computer system. Via the keyboard, the user may input characters and instructions into the computer system.

FIG. 1 is a schematic view illustrating the outward appearance of a conventional keyboard. The surface of the keyboard 1 includes plural keys. These keys include ordinary keys 10, numeric keys 11 and function keys 12. When one or more keys are depressed by the user, a corresponding signal is issued to the computer, and thus the computer executes a function corresponding to the depressed key or keys. For example, when the ordinary keys 10 are depressed, corresponding English letters or symbols are inputted into the computer system. In addition, the function keys 12 (F1~F12) can be programmed to cause corresponding application programs to provide certain functions.

Hereinafter, the internal circuitry of the conventional keyboard device will be illustrated with reference to FIG. 2. FIG. 2 is a schematic circuit diagram illustrating the internal circuitry of the conventional keyboard. The keyboard 1 includes a controlling unit 13 and a keyboard scanning matrix 14. The controlling unit 13 is connected with plural input/output (I/O) ports through multiple pins. Generally, the controlling unit 13 is a microprocessor. The other parts of the microprocessor are known in the art, and are not redundantly described herein. The keyboard scanning matrix 14 includes plural I/O ports (X0~X7 and Y0~YG). These I/O ports crisscross to define the keyboard scanning matrix 14. As shown in FIG. 2, since the keyboard scanning matrix 14 is an 8×16 matrix, there are a total of 128 key intersection points corresponding to 128 keys on the surface of the keyboard 1. In other word, if there are 128 keys on the surface of the keyboard 1, the internal circuit of the keyboard device 1 should have at least 24 I/O ports.

With the maturity of computing technologies, the keyboard with basic functions fails to meet the users' requirements. For this reason, the keyboard manufacturers make efforts in designing novel keyboards with diversified functions. Recently, a pressure sensitive keyboard having a pressure sensing function has been disclosed. In the pressure sensitive keyboard, a pressure sensing module is disposed under the plural keys for sensing the pressure exerted on the key that is depressed by the user. Generally, the pressure sensitive keyboard has a preset pressure value. In a case that the pressure exerted on the depressed key is lower than the preset pressure value, the pressure sensitive keyboard issues a first sensing signal. In response to the first sensing signal, the computer executes a first instruction. Whereas, in a case that the pressure exerted on the depressed key is higher than the preset pressure value, the pressure sensitive keyboard issues a second sensing signal. In response to the second sensing signal, the computer executes a second instruction.

Take a process of inputting a character to a Notepad document for example. The key to be depressed is the key A. In a case that a first pressure lower than the preset pressure value is exerted on the key A, a small letter "a" is shown on the Notepad document in response to the depressing action of the user. Whereas, in a case that a second pressure higher than the preset pressure value is exerted on the key A, a capital letter "A" is shown on the Notepad document in response to the depressing action of the user.

Although the conventional pressure sensitive keyboard has good practicability, there are still some drawbacks. For example, the new users or uneducated users of the pressure sensitive keyboard usually fail to judge whether the pressure exerted on the depressed key is higher than the preset pressure value or not. That is, when a key is depressed, the users usually fail to realize which instruction will be executed by the computer. Therefore, there is a need of proving a pressure sensitive keyboard having a function of recognizing the strength of the pressure exerted on the depressed key.

SUMMARY OF THE INVENTION

The present invention provides a pressure sensitive and luminous keyboard having a function of recognizing the strength of the pressure exerted on the depressed key.

In accordance with an aspect of the present invention, there is provided a pressure sensitive and luminous keyboard. The pressure sensitive and luminous keyboard includes a base, plural keys, a membrane switch circuit module, an illumination module and a controlling unit. The plural keys are disposed over the base. When each of the plural keys is depressed, a sensing signal is generated in response to a pressure exerted on the depressed key. The membrane switch circuit module is arranged between the base and the plural keys. The membrane switch circuit includes a pressure detecting circuit for detecting the pressure, thereby generating a corresponding pressure-strength sensing voltage. The illumination module is arranged between the base and the plural keys for emitting either a first light beam or a second light beam. The controlling unit is connected with the membrane switch circuit module and the illumination module for judging strength of the pressure according to the pressure-strength sensing voltage, and controlling the illumination module to emit either the first light beam or the second light beam according to the strength of the pressure.

In an embodiment, the membrane switch circuit module includes a first membrane circuit board and a second membrane circuit board. The first membrane circuit board has plural scan input lines. The plural scan input lines has respective low-impedance input contacts. The second membrane circuit board is laminated with the first membrane circuit board, and has plural scan output lines. The plural scan output lines have respective low-impedance output contacts. The plural scan output lines and the plural scan input lines crisscross to define a keyboard scanning matrix. The low-impedance input contacts and the low-impedance output contacts of the keyboard scanning matrix collectively define plural intersection points corresponding to respective keys. When a first key of the plural keys is depressed, a first low-impedance input contact of the plural scan input lines corresponding to the first key and a first low-impedance output contact of the plural low-impedance output contact corresponding to the first key are contacted with each other.

In an embodiment, the illumination module includes plural light emitting diodes and a light guide plate. The plural light emitting diodes are arranged at bilateral sides of the plural keys for emitting either the first light beam or the second light beam. The light guide plate laminated with the membrane switch circuit module for changing propagating directions of the first light beam and the second light beam, so that the first light beam and the second light beam are guided to enter the light guide plate in a first direction and leave the light guide plate in a second direction, wherein the first direction is parallel with the membrane switch circuit module, and the first direction and the second direction are perpendicular to each other.

In an embodiment, the membrane switch circuit module is disposed on the light guide plate.

In an embodiment, the light guide plate is disposed on the membrane switch circuit module, and includes plural perforations.

In an embodiment, the pressure detecting circuit includes plural pressure detecting elements. Each of the plural pressure detecting elements includes a high-impedance detecting contact and a low-impedance detecting contact. When one of the plural keys is depressed in response to a first pressure, the high-impedance detecting contact and the low-impedance detecting contact corresponding to the depressed key are contacted with each other to have a first contact area, so that the pressure detecting element has a first impedance value. Whereas, when one of the plural keys is depressed in response to a second pressure higher than the first pressure, the high-impedance detecting contact and the low-impedance detecting contact corresponding to the depressed key are contacted with each other to have a second contact area greater than the first contact area, so that the pressure detecting element has a second impedance value higher than the first impedance value.

In an embodiment, the pressure detecting circuit further includes a detecting resistor, which is grounded and has a detecting impedance value. The plural pressure detecting elements are respectively connected with the detecting resistor in series. The pressure detecting circuit generates the pressure-strength sensing voltage according to the detecting impedance value and the first impedance value or the second impedance value. When the pressure detecting circuit generates a first pressure-strength sensing voltage according to the detecting impedance value and the first impedance value, the controlling unit judges that the depressed key is depressed in response to the first pressure and the controlling unit controls the illumination module to emit the first light beam. Whereas, when the pressure detecting circuit generates a second pressure-strength sensing voltage according to the detecting impedance value and the second impedance value, the controlling unit judges that the depressed key is depressed in response to the second pressure, and the controlling unit controls the illumination module to emit the second light beam.

In an embodiment, each of the plural keys includes a keycap, a scissors-type connecting member and an elastic element.

In an embodiment, the first light beam has a first light color, and the second light beam has a second light color.

In an embodiment, the first light beam flickers at a first frequency, and the second light beam flickers at a second frequency, wherein the first frequency is lower than the second frequency. The keycap is exposed outside the base. When the keycap is depressed, the sensing signal corresponding to the depressed key is generated. The scissors-type connecting member is connected with the keycap, so that the keycap is movable upwardly or downwardly within a travelling distance with respect to the base. The elastic element is disposed under the keycap. When the keycap is depressed and moved downwardly with respect to the base, an elastic force is accumulated. When the keycap is released, the elastic force is applied on the keycap, so that the keycap is moved upwardly with respect to the base.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
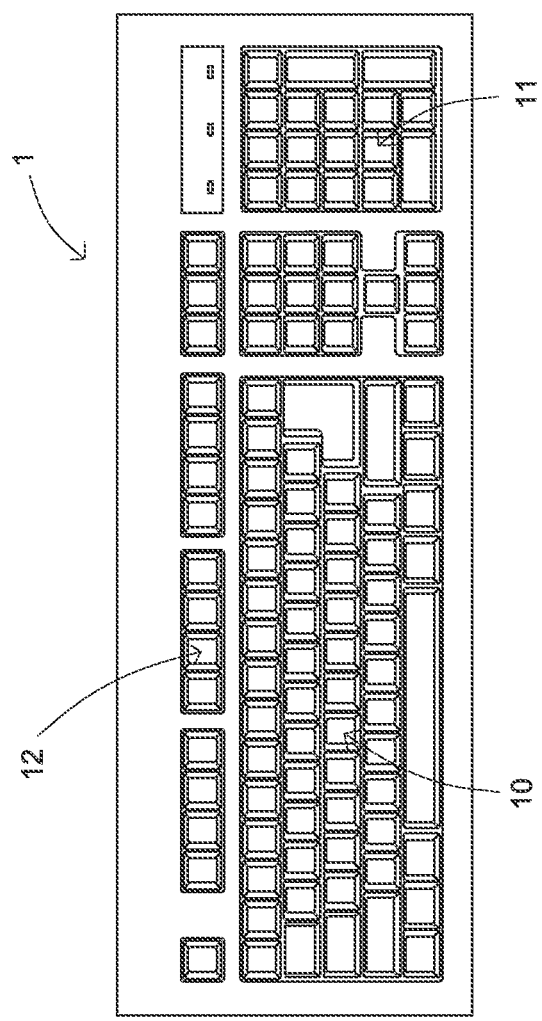
FIG. 1 is a schematic view illustrating the outward appearance of a conventional keyboard.
Figure 2:
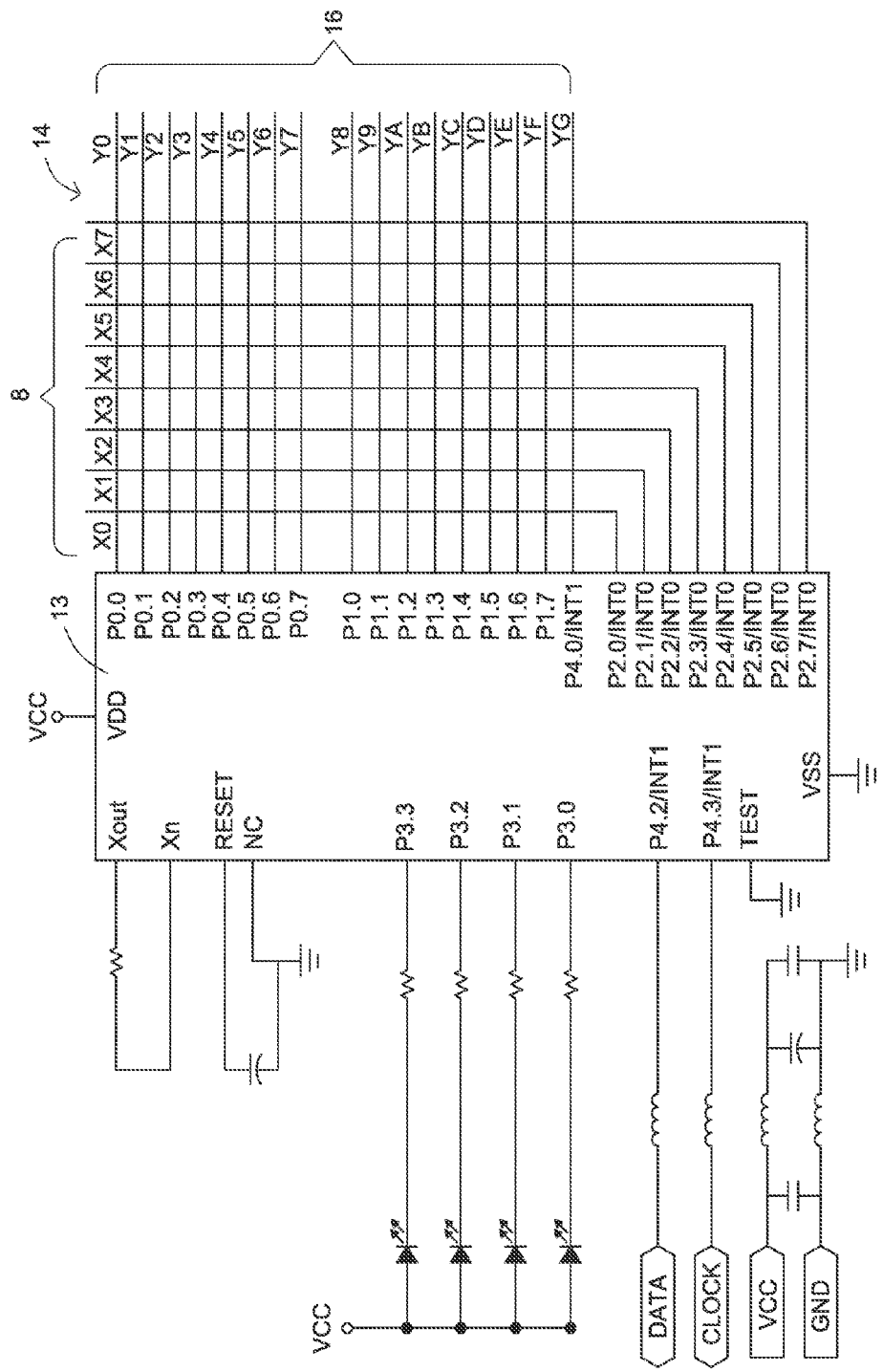
FIG. 2 is a schematic circuit diagram illustrating the internal circuitry of the conventional keyboard.
Figure 3:
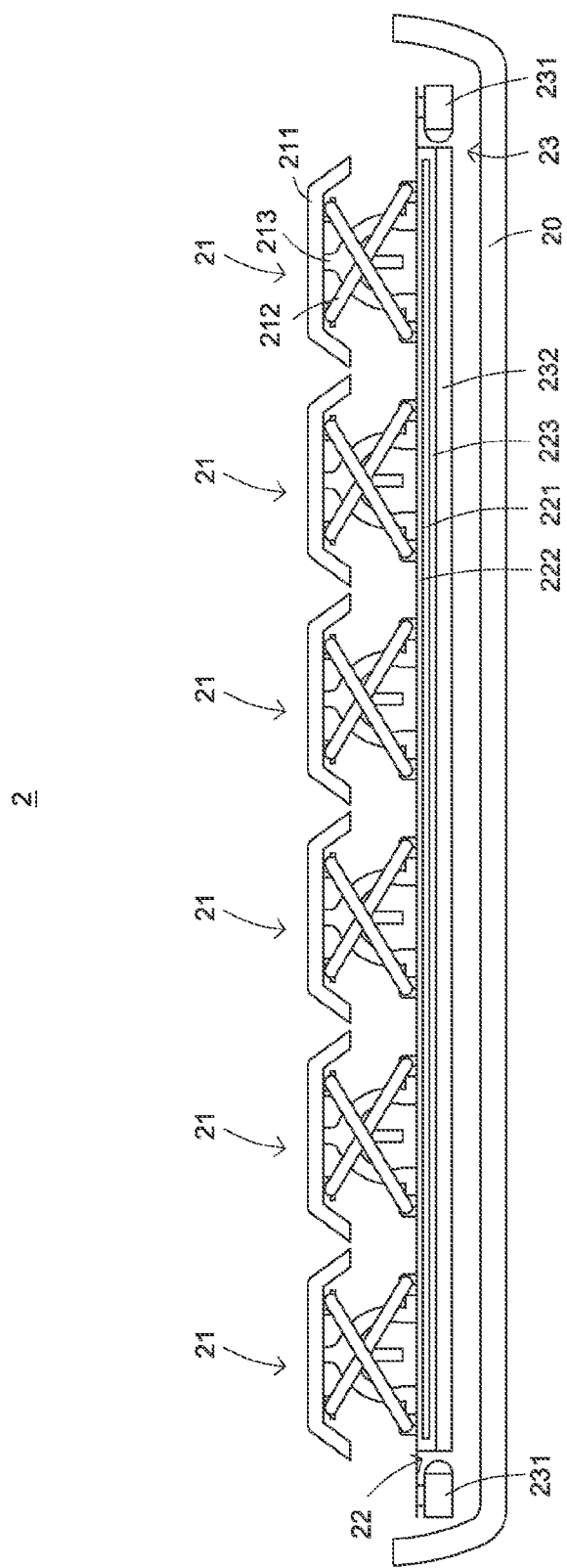
FIG. 3 is a schematic cross-sectional view illustrating a pressure sensitive and luminous keyboard according to an embodiment of the present invention.

For obviating the drawbacks encountered from the prior art, the present invention provides a pressure sensitive and luminous keyboard. FIG. 3 is a schematic cross-sectional view illustrating a pressure sensitive and luminous keyboard according to an embodiment of the present invention. In this embodiment, the pressure sensitive and luminous keyboard 2 comprises a base 20, plural keys 21, a membrane switch circuit module 22, an illumination module 23 and a controlling unit 24 (see FIG. 5). The plural keys 21 are disposed over the base 20. When each of the keys 21 is depressed by the user, a sensing signal is generated in response to the pressure exerted on the depressed key 21. The membrane switch circuit module 22 is arranged between the base 20 and the plural keys 21, and disposed on the illumination module 23. The membrane switch circuit module 22 has a pressure detecting circuit 221. The pressure detecting circuit 221 is used for detecting the pressure exerted on the depressed key 21, thereby generating a corresponding pressure-strength sensing voltage. The illumination module 23 is arranged between the base 20 and the plural keys 21. In this embodiment, the illumination module 23 comprises plural light emitting diodes (LEDs) 231 and a light guide plate 232. The plural light emitting diodes 231 are respectively arranged at bilateral sides of the plural keys 21 for emitting either a first light beam B1 (see FIG. 7) or a second light beam B2 (see FIG. 8). For clarification and brevity, only two light emitting diodes 231 are shown in the drawings. The light guide plate 232 is laminated with the membrane switch circuit module 22, and disposed under the membrane switch circuit module 22. The light guide plate 232 is used for changing the propagating directions of the first light beam B1 and the second light beam B2. In some embodiments, the first light beam B1 has a first light color, and the second light beam B2 has a second light color. In some embodiments, the first light beam B1 flickers at a first frequency, and the second light beam B2 flickers at a second frequency, wherein the first frequency is lower than the second frequency. In this embodiment, the first light beam B1 has a first light color (e.g. a blue light color), and the second light beam B2 has a second light color (e.g. a green light color).

Figure 4:
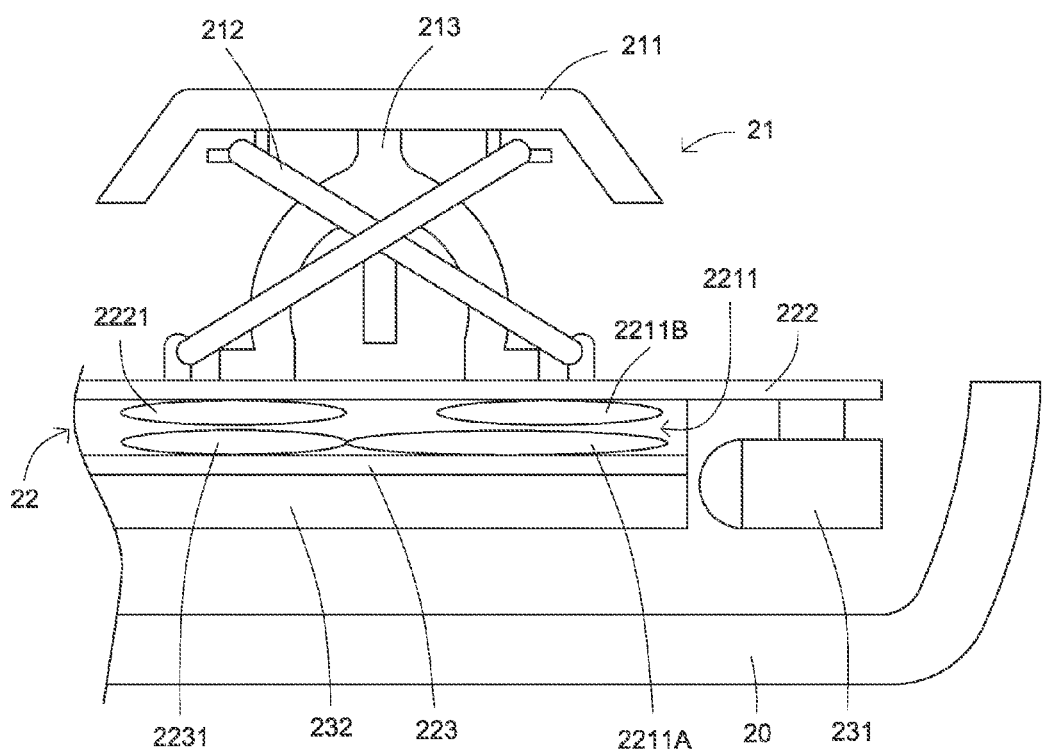
FIG. 4 is a schematic cross-sectional view illustrating a key of a pressure sensitive and luminous keyboard according to an embodiment of the present invention.

Hereinafter, the structure of the pressure sensitive and luminous keyboard of the present invention will be illustrated by referring to a single key. FIG. 4 is a schematic cross-sectional view illustrating a key of a pressure sensitive and luminous keyboard according to an embodiment of the present invention. From top to bottom, a specified key 21, the membrane switch circuit module 22, the illumination module 23 and the base 20 are successively shown in FIG. 4. The specified key 21 is for example the rightmost key 21 of the pressure sensitive and luminous keyboard 2. The structure of the key 21 will be illustrated as follows. The key 21 comprises a keycap 211, a scissors-type connecting member 212 and an elastic element 213. The keycap 211 is exposed outside the base 20 to be depressed by a user. When the keycap 211 is depressed, a corresponding signal is generated. The keycap 211 may be made of translucent or transparent material, so that the keycap 211 is light-transmissible. The scissors-type connecting member 212 is connected with the keycap 211, so that the keycap 211 is movable upwardly or downwardly with respect to the base 20. The elastic element 213 is disposed under the keycap 211. When the keycap 211 is depressed by the user and moved downwardly with respect to the base 20, an elastic force is accumulated. Whereas, when the keycap 211 is released and no longer depressed by the user, the elastic force is applied on the keycap 211 to cause the keycap 211 to move upwardly with respect to the base, so that the keycap 211 is returned to the original position where no pressure is applied thereon. In this embodiment, the elastic element 213 is made of rubbery material.

In this embodiment, the pressure detecting circuit 221 comprises plural pressure detecting elements 2211 corresponding to respective keys 21. For illustration, the key 21 is for example the rightmost key 21 of the pressure sensitive and luminous keyboard 2. As shown in FIG. 4, the pressure detecting element 2211 corresponding to the rightmost key 21 comprises a high-impedance detecting contact 2211A and a low-impedance detecting contact 2211B. In an embodiment, the pressure detecting element 2211 is a force sensing resistor (FSR), the high-impedance detecting contact 2211A is made of graphite, and the low-impedance detecting contact 2211B is made of metallic material. In a case that the key 21 has not been depressed by the user, the pressure detecting element 2211 has a first impedance value because the high-impedance detecting contact 2211A has an inherent high impedance value. Whereas, when the key 21 is depressed by the user, the high-impedance detecting contact 2211A and the low-impedance detecting contact 2211B are contacted with each other, so that the pressure detecting element 2211 has a second impedance value r2 (see FIG. 5). The second impedance value is lower than the first impedance value. In addition, since the key 21 is depressed, the light emitting diodes 231 of the illumination module 23, which is disposed under the membrane switch circuit module 22, will emit either the first light beam B1 or the second light beam B2. The propagating directions of the first light beam B1 and the second light beam B2 will be changed by the light guide plate 232.

Figure 5:
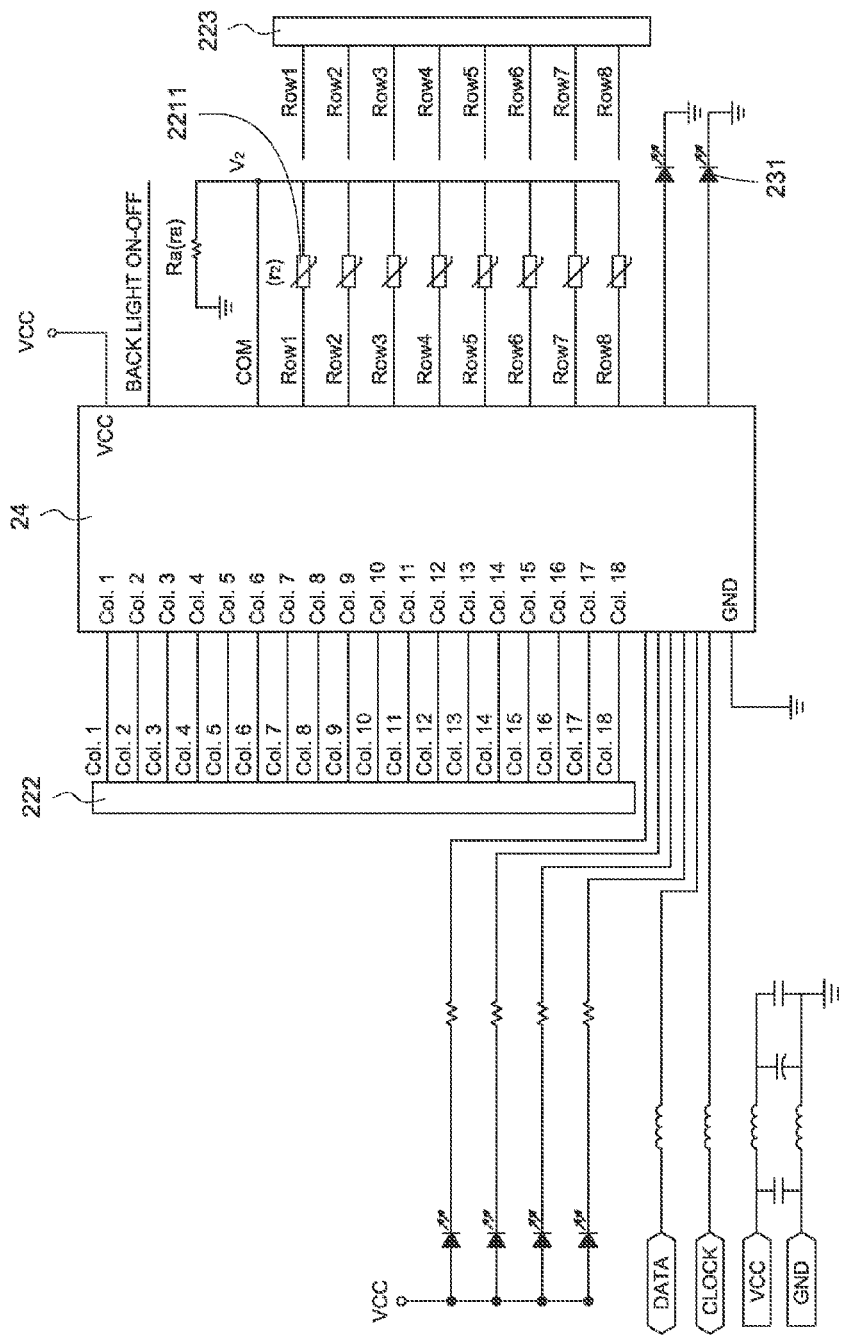
FIG. 5 is a schematic circuit diagram illustrating the internal circuitry of a pressure sensitive and luminous keyboard according to an embodiment of the present invention.

FIG. 5 is a schematic circuit diagram illustrating the internal circuitry of a pressure sensitive and luminous keyboard according to an embodiment of the present invention. Please refer to FIGS. 4 and 5. In addition to the pressure detecting circuit 221, the membrane switch circuit module 22 further comprises a first membrane circuit board 222 and a second membrane circuit board 223. The second membrane circuit board 223 is laminated with the first membrane circuit board 222. Furthermore, the first membrane circuit board 222 comprises plural scan input lines Col.1~Col.18. Each of the scan input lines has a corresponding low-impedance input contact 2221. The second membrane circuit board 223 has plural scan output lines Row1~Row8. Each of the scan output lines has a low-impedance output contact 2231. In this embodiment, both of the low-impedance input contact 2221 and the low-impedance output contact 2231 are made of metallic material. The plural scan output lines Row1~Row8 and the plural scan input lines Col.1~Col.18 crisscross to define a keyboard scanning matrix M corresponding to the plural keys 21 (see FIG. 6).

Figure 6:
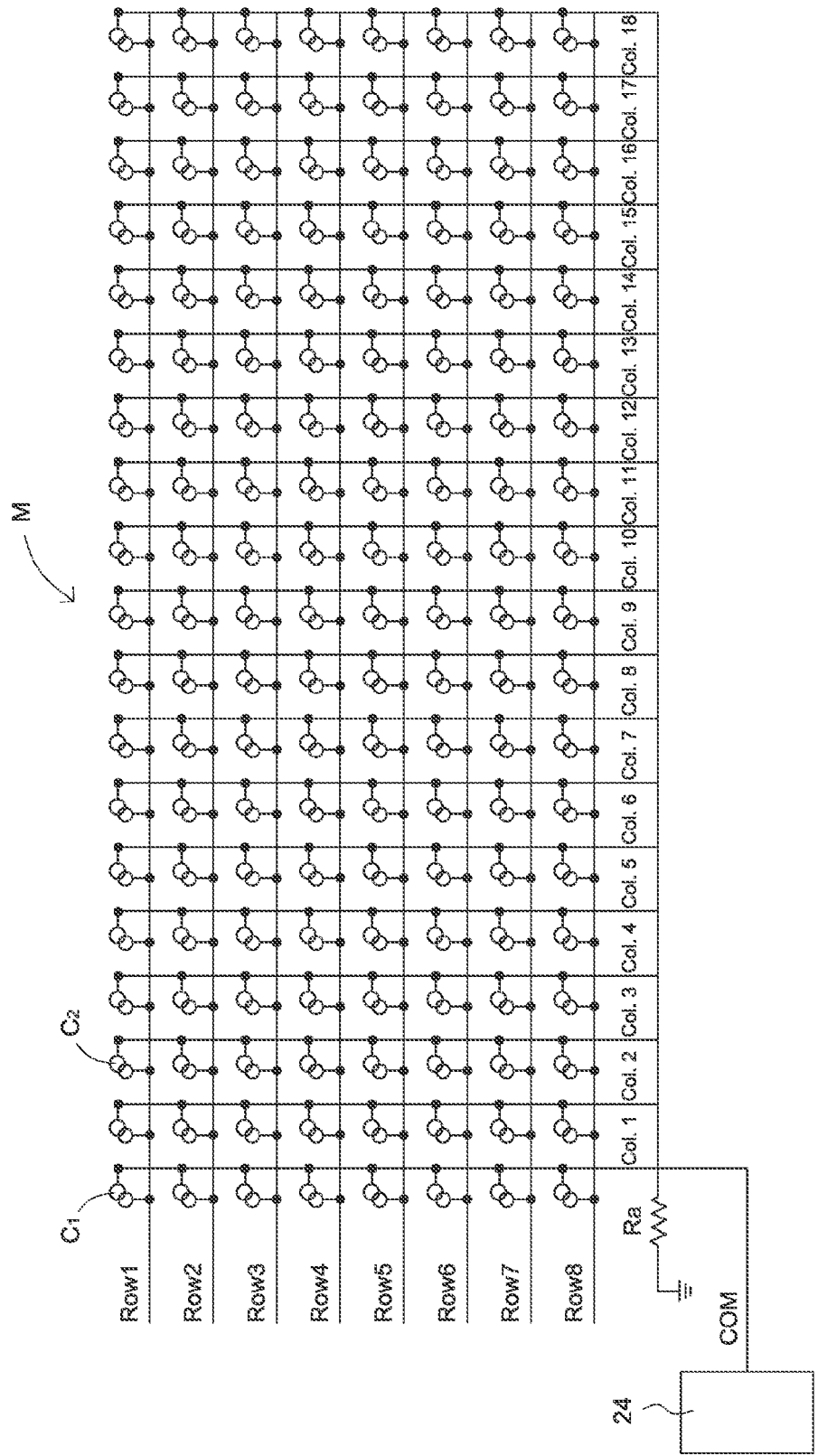
FIG. 6 is a schematic circuit diagram illustrating a keyboard scanning matrix of a pressure sensitive and luminous keyboard according to an embodiment of the present invention.

FIG. 6 is a schematic circuit diagram illustrating a keyboard scanning matrix of a pressure sensitive and luminous keyboard according to an embodiment of the present invention. Please refer to FIGS. 5 and 6. In the keyboard scanning matrix M, the low-impedance input contact 2221 and the low-impedance output contact 2231 collectively define plural intersection points (e.g. C1, C2, . . . ) corresponding to the plural keys 21. Since the keyboard scanning matrix M is an 8×18 matrix, the plural scan output lines Row1~Row8 and the plural scan input lines Col.1~Col.18 crisscross to define 144 key intersection points corresponding to 144 keys. As shown in FIG. 6, the first scan input line Col.1 and the first scan output line Row1 crisscross to define the first key intersection point C1; and the third scan input line Col.3 and the first scan output line Row1 crisscross to define the second key intersection point C2. As shown in FIG. 5, the pressure detecting circuit 221 further comprises a detecting resistor Ra. The detecting resistor Ra has a detecting impedance value ra. Each pressure detecting element 2211 of the pressure detecting circuit 221 and the detecting resistor Ra are connected with each other in series. Due to the voltage division of the detecting impedance value ra and the impedance value of the pressure detecting element 2211, the pressure-strength sensing voltage is generated. Moreover, as shown in FIG. 5, the controlling unit 24 is connected with the membrane switch circuit module 22 and the plural light emitting diodes 231 of the illumination module 23 for judging which key is depressed. The controlling unit 24 has a predetermined threshold voltage value. In addition, the controlling unit 24 may judge the strength of the pressure exerted on the depressed key 21 according to the magnitude relation between the pressure-strength sensing voltage and the threshold voltage value, and control the plural light emitting diodes 231 to emit either the first light beam B1 or the second light beam B2.

For example, a first key 21 of the plural keys 21 corresponds to the first key intersection point C1. The first key intersection point C1 is defined by crisscrossing the first scan output line Row1 of the plural scan output lines Row1~Row8 and the first scan input line Col.1 of the plural scan input lines Col.1~Col.18. In a case that the key 21 has not been depressed by the user, the pressure detecting element 2211 has a first impedance value. The first impedance value is set to be equal to the detecting impedance value ra. As a consequence, a first pressure-strength sensing voltage detected by the pressure detecting circuit 221 is a half of a high-logic voltage. For example, the high-logic voltage is 5 volts. In the case that the key 21 has not been depressed by the user, the first pressure-strength sensing voltage is 2.5 volts. Whereas, when the first key 21 is depressed by the user, the first low-impedance input contact 2221 of the first membrane circuit board 222 and the first low-impedance output contact 2231 of the second membrane circuit board 223 are contacted with each other. In this situation, the electrical connection between the first scan input line Col.1 and the first scan output line Row1 is rendered. According to the electrical connection between the first scan input line Col.1 and the first scan output line Row1, the controlling unit 24 judges that the first key 21 is being depressed by the user. The actions of pressing the other key intersection points (e.g. the second key intersection point C2 of the keyboard scanning matrix M are similar to those of the first key intersection point C1, and are not redundantly described herein.

Figure 7:
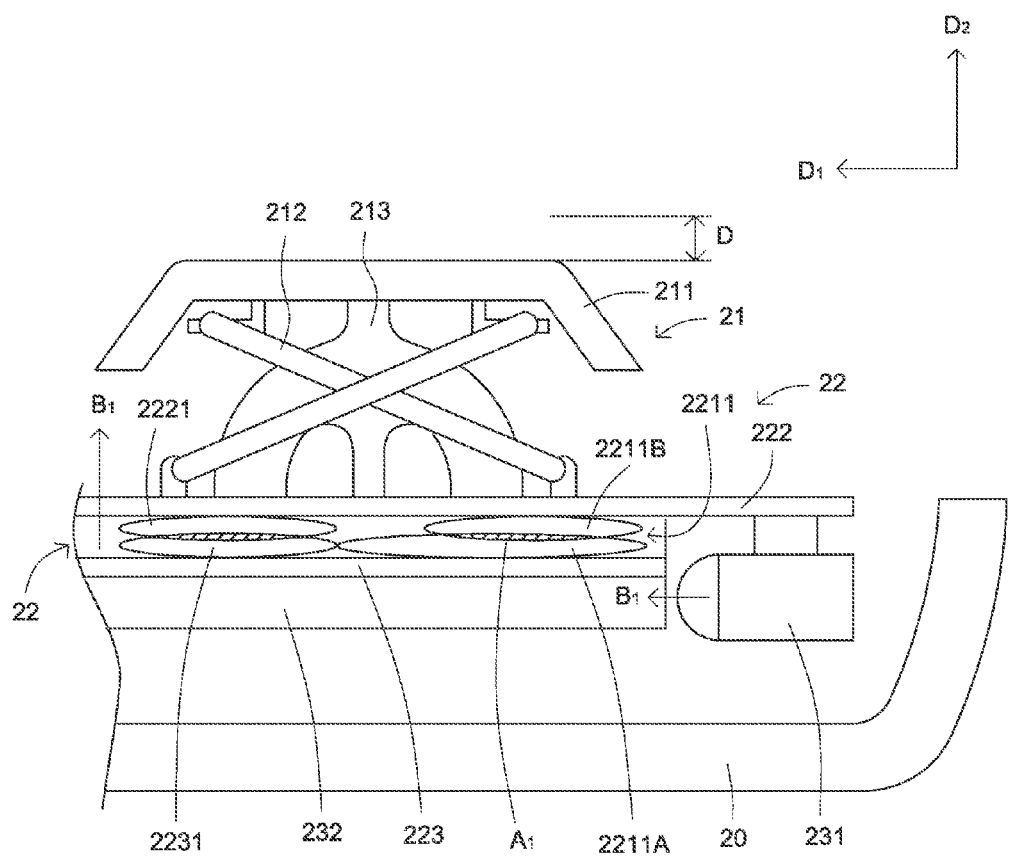
FIG. 7 is a schematic cross-sectional view illustrating a first key of a pressure sensitive and luminous keyboard according to an embodiment of the present invention when the first key is lightly depressed.

Hereinafter, a process of pressing the first key 21 with different pressure strengths will be illustrated with reference to FIGS. 4 and 7. FIG. 7 is a schematic cross-sectional view illustrating a first key of a pressure sensitive and luminous keyboard according to an embodiment of the present invention when the first key is lightly depressed. In a case that the key 21 has not been depressed by the user (see FIG. 4), the first low-impedance input contact 2221 of the first membrane circuit board 222 and the first low-impedance output contact 2231 of the second membrane circuit board 223 corresponding to the first key 21 are separated from each other. In addition, the high-impedance detecting contact 2211A and the low-impedance detecting contact 2211B of the first pressure detecting element 2211 corresponding to the first key 21 are also separated from each other. When the first key 21 is depressed in response to a first pressure strength, the keycap 211 is moved for a first preset travelling distance D from the original position to push the elastic element 213, so that the first membrane circuit board 222 is pushed by the elastic element 213. In this situation, the first low-impedance input contact 2221 of the first membrane circuit board 222 and the first low-impedance output contact 2231 of the second membrane circuit board 223 are contacted with each other. As a consequence, the electrical connection between the first scan input line Col.1 and the first scan output line Row1 is rendered. At the same time, the high-impedance detecting contact 2211A and the low-impedance detecting contact 2211B of the first pressure detecting element 2211 are also contacted with each other, wherein there is a first contact area A1 between the high-impedance detecting contact 2211A and the low-impedance detecting contact 2211B. Meanwhile, the first pressure detecting element 2211 has a second impedance value r2, wherein the second impedance value r2 is lower than the first impedance value.

When the first key 21 is depressed, the electrical connection between the first scan input line Col.1 and the first scan output line Row1 is rendered (see FIG. 5). As a consequence, a high-logic voltage (5 volts) is generated. Since an end of the detecting resistor Ra is connected to a ground terminal, a voltage-division loop consisting of the detecting resistor Ra and the first pressure detecting element 2211 causes the pressure detecting circuit 221 to generate a second pressure-strength sensing voltage V2. Since the second impedance value r2 is lower than the first impedance value, the second pressure-strength sensing voltage V2 (e.g. 3 volts) is higher than the first pressure-strength sensing voltage (e.g. 2.5 volts). By comparing the second pressure-strength sensing voltage V2 with the predetermined threshold voltage value (e.g. 4 volts), the controlling unit 24 may judge that the pressure-strength sensing voltage V2 is lower than the threshold voltage value. In this situation, the controlling unit 24 will judge that the first pressure exerted on the depressed first key 21 has light pressure strength. Moreover, the controlling unit 24 will control the plural light emitting diodes 231 to emit the first light beam B1. In other words, a blue light beam is emitted from the pressure sensitive and luminous keyboard 2.

Figure 8:
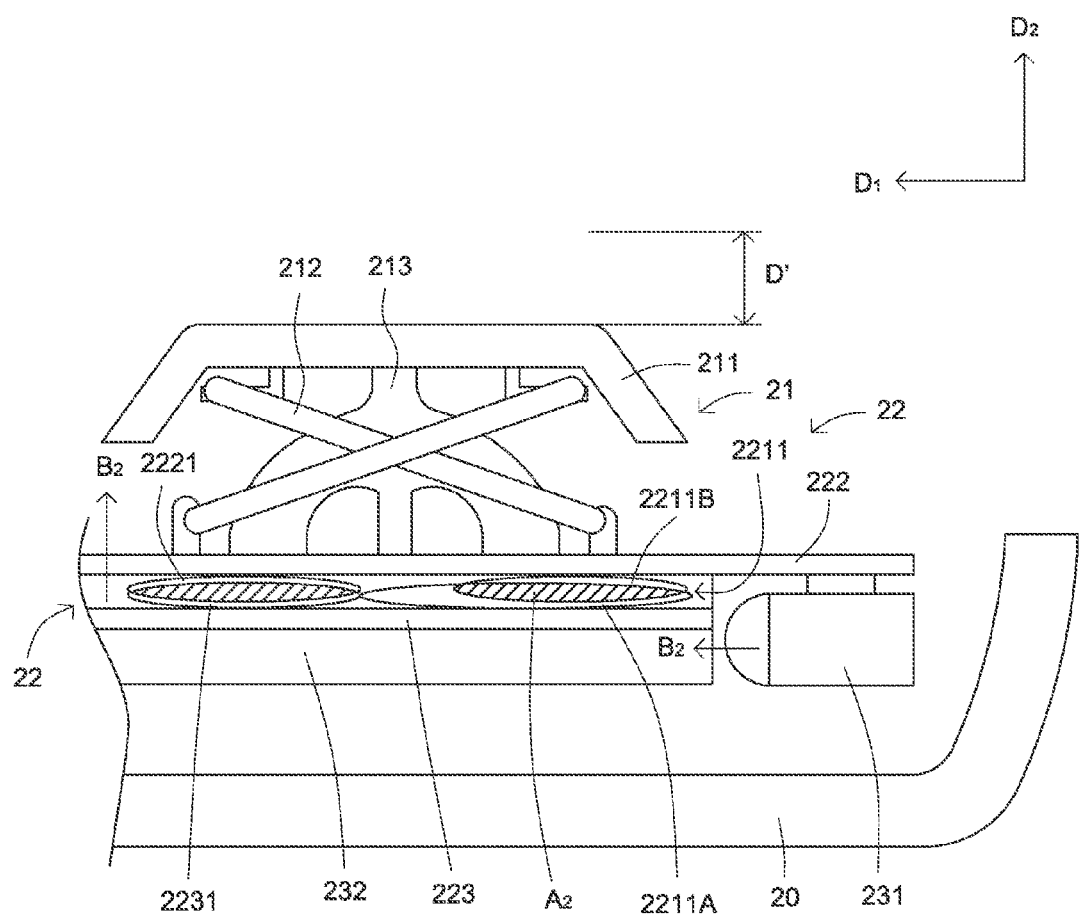
FIG. 8 is a schematic cross-sectional view illustrating a first key of a pressure sensitive and luminous keyboard according to an embodiment of the present invention when the first key is heavily depressed.
Figure 9:
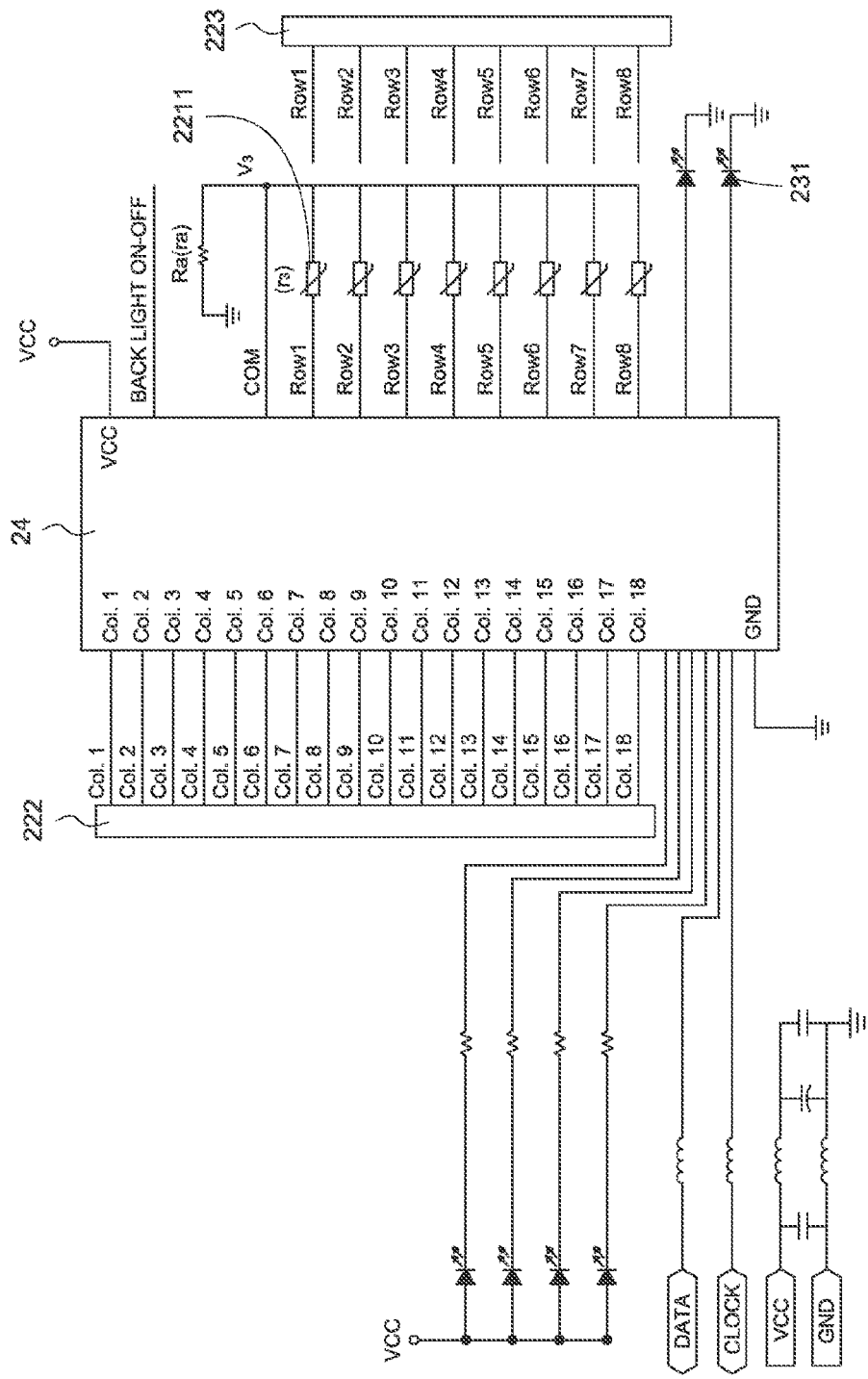
FIG. 9 is a schematic circuit diagram illustrating the internal circuitry of a pressure sensitive and luminous keyboard according to an embodiment of the present invention when the first key is heavily depressed.

FIG. 8 is a schematic cross-sectional view illustrating a key of a pressure sensitive and luminous keyboard according to an embodiment of the present invention when the first key is heavily depressed. FIG. 9 is a schematic circuit diagram illustrating the internal circuitry of a pressure sensitive and luminous keyboard according to an embodiment of the present invention when the first key is heavily depressed. Please refer to FIGS. 8 and 9. When the first key 21 is depressed in response to a second pressure strength, the keycap 211 is moved for a second preset travelling distance D' from the original position to push the elastic element 213, so that the first membrane circuit board 222 is pushed by the elastic element 213. In this situation, the first low-impedance input contact 2221 of the first membrane circuit board 222 and the first low-impedance output contact 2231 of the second membrane circuit board 223 are contacted with each other. As a consequence, the electrical connection between the first scan input line Col.1 and the first scan output line Row 1 is rendered. At the same time, the high-impedance detecting contact 2211A and the low-impedance detecting contact 2211B of the first pressure detecting element 2211 are also contacted with each other, wherein there is a second contact area A2 between the high-impedance detecting contact 2211A and the low-impedance detecting contact 2211B. Meanwhile, the first pressure detecting element 2211 has a third impedance value r3, wherein the third impedance value r3 is lower than the second impedance value r2.

When the first key 21 is depressed, the electrical connection between the first scan input line Col.1 and the first scan output line Row1 is rendered (see FIG. 5). As a consequence, a high-logic voltage (5 volts) is generated. Since an end of the detecting resistor Ra is connected to a ground terminal, a voltage-division loop consisting of the detecting resistor Ra and the first pressure detecting element 2211 causes the pressure detecting circuit 221 to generate a third pressure-strength sensing voltage V3. Since the third impedance value r3 is lower than the second impedance value r2, the third pressure-strength sensing voltage V3 (e.g. 4.3 volts) is higher than the second pressure-strength sensing voltage V2 (e.g. 3 volts). By comparing the third pressure-strength sensing voltage V3 with the predetermined threshold voltage value (e.g. 4 volts), the controlling unit 24 may judge that the third pressure-strength sensing voltage V3 is higher than the threshold voltage value. In this situation, the controlling unit 24 will judge that the first pressure exerted on the depressed first key 21 has heavy pressure strength. Moreover, the controlling unit 24 will control the plural light emitting diodes 231 to emit the second light beam B2. In other words, a green light beam is emitted from the pressure sensitive and luminous keyboard 2.

It is noted that the first contact area A1 between the high-impedance detecting contact 2211A and the low-impedance detecting contact 2211B is relatively smaller when the first key 21 is lightly depressed. As a consequence, the electrical conductance between the high-impedance detecting contact 2211A and the low-impedance detecting contact 2211B is smaller. In this situation, the second impedance value r2 generated by the first pressure detecting element 2211 is relatively larger. As the second impedance value r2 is increased, the second pressure-strength sensing voltage V2 resulted from voltage division is reduced. By comparing the second pressure-strength sensing voltage V2 with the threshold voltage value, the controlling unit 24 may judge whether the pressure exerted on the depressed key 21 is light or heavy. Since the threshold voltage value is acquired experimentally, the use of the threshold voltage value as a judgment basis has satisfactory reliability. Similarly, when the first key 21 is heavily depressed, the second contact area A2 between the high-impedance detecting contact 2211A and the low-impedance detecting contact 2211B is relatively larger, so that the electrical conductance between the high-impedance detecting contact 2211A and the low-impedance detecting contact 2211B is larger. In this situation, the third impedance value r3 generated by the first pressure detecting element 2211 is relatively smaller, and the third pressure-strength sensing voltage V3 resulted from voltage division is increased. Meanwhile, the controlling unit 24 may judge that the pressure exerted on the depressed key 21 is heavy.

Please refer to FIG. 7 again. In a case that the plural light emitting diodes 231 emits the first light beam B1, the first light beam B1 enters the light guide plate 232 in a first direction D1. The first direction D1 is a horizontal direction that is parallel with the membrane switch circuit module 22. Since the first light beam B1 is reflected and refracted by the light guide plate 232, the propagating direction of the first light beam B1 is changed. For example, the first light beam B1 leaves the light guide plate 232 in a second direction D2 perpendicular to the first direction D1. The second direction D2 is a vertical direction that is perpendicular to the membrane switch circuit module 22. The first light beam B1 is refracted and scattered by the internal structures of the plural keys to be transmitted through the keycap 211. In this situation, the pressure sensitive and luminous keyboard 2 has luminous efficacy to provide blue light. The direction of the second light beam B2 emitted from the plural light emitting diodes 231 is also adjusted by the light guide plate 232 in the same way.

Figure 10:
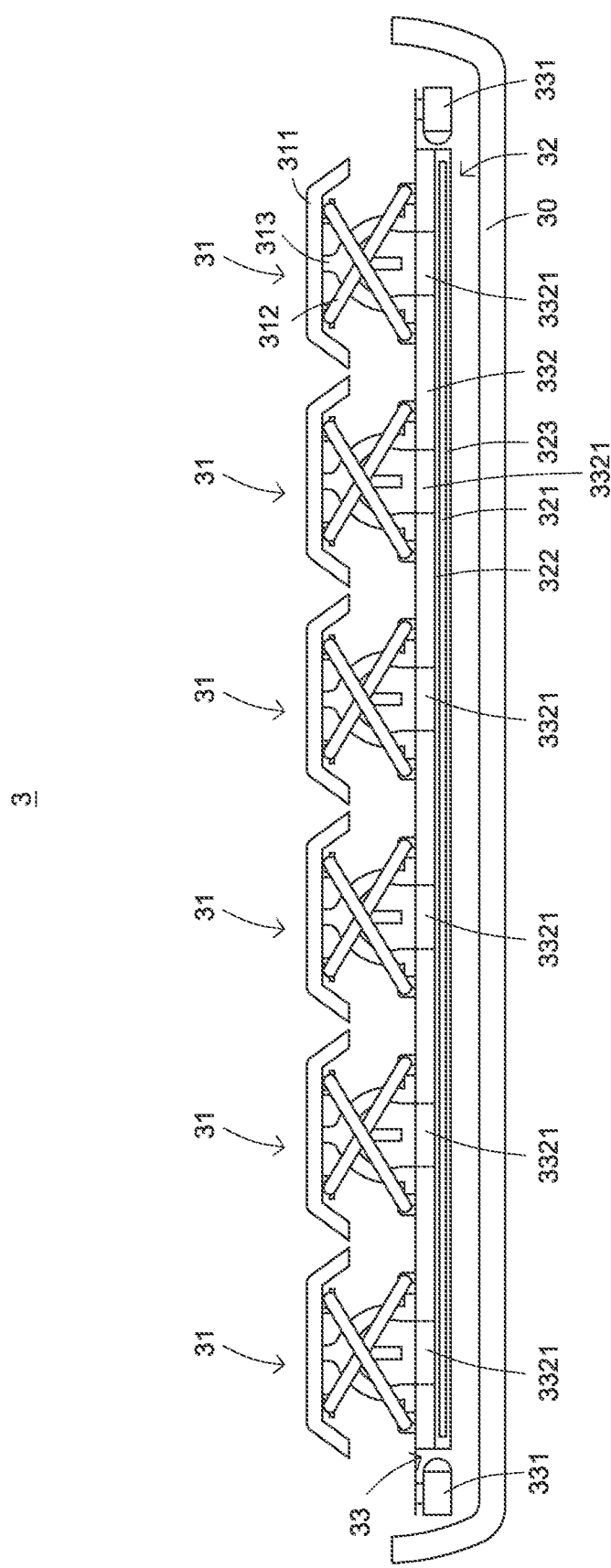
FIG. 10 is a schematic cross-sectional view illustrating a pressure sensitive and luminous keyboard according to another embodiment of the present invention.

The present further provides another embodiment. FIG. 10 is a schematic cross-sectional view illustrating a pressure sensitive and luminous keyboard according to another embodiment of the present invention. In this embodiment, the pressure sensitive and luminous keyboard 3 comprises a base 30, plural keys 31, a membrane switch circuit module 32, an illumination module 33 and a controlling unit (not shown). The plural keys 31 are disposed over the base 30. When each of the keys 31 is depressed by the user, a sensing signal is generated in response to the pressure exerted on the depressed key 31. The membrane switch circuit module 32 is arranged between the base 30 and the plural keys 31. In addition, the membrane switch circuit module 32 has a pressure detecting circuit 321. The pressure detecting circuit 321 is used for detecting the pressure exerted on the depressed key 31, thereby generating a corresponding pressure-strength sensing voltage. The illumination module 33 is arranged between the base 30 and the plural keys 31. In this embodiment, the illumination module 33 is disposed on the membrane switch circuit module 32. The illumination module 33 comprises plural light emitting diodes 331 and a light guide plate 332. The plural light emitting diodes 331 are respectively arranged at bilateral sides of the plural keys 31 for emitting either a first light beam (not shown) or a second light beam (not show). The light guide plate 332 is laminated with the membrane switch circuit module 32, and disposed on the membrane switch circuit module 32. The light guide plate 332 is used for changing the propagating directions of the first light beam and the second light beam. The light guide plate 332 comprises plural perforations 3321 and aligned with the respective keys 31. When each of the keys 31 is depressed, the depressed key 31 is penetrated through the corresponding perforation 3321 to trigger the membrane switch circuit module 32.

In comparison with the pressure sensitive and luminous keyboard 2 of the above embodiment, the relative location between the membrane switch circuit module (having the pressure detecting circuit) and the illumination module of the pressure sensitive and luminous keyboard 3 is distinguished. In the pressure sensitive and luminous keyboard 2 of the above embodiment, the membrane switch circuit module 22 and the illumination module 23 are both arranged between the base 20 and the plural keys 21, and the membrane switch circuit module 22 is stacked on the illumination module 23 (see FIG. 3). In the pressure sensitive and luminous keyboard 3 of this embodiment, the membrane switch circuit module 32 and the illumination module 33 are both arranged between the base 30 and the plural keys 31, but the illumination module 33 is stacked on the membrane switch circuit module 32 (see FIG. 10). The operating principles of the pressure sensitive and luminous keyboard 3 are similar to those described above, and are not redundantly described herein.

From the above description, the pressure sensitive and luminous keyboard of the present invention is capable of executing different instructions according to the pressure exerted on the depressed key. In addition, the pressure sensitive and luminous keyboard may emit different light beams in response to different pressure strengths. The different light beams emitted from the pressure sensitive and luminous keyboard of the present invention may prompt the user to realize which instruction corresponding to the depressed key will be executed by a computer. In other words, the user may be quickly familiar with the operations of the pressure sensitive and luminous keyboard.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A pressure sensitive and luminous keyboard, comprising:

a base;

plural keys disposed over said base, wherein when each of said plural keys is depressed, a sensing signal is generated in response to a pressure exerted on said depressed key;

a membrane switch circuit module arranged between said base and said plural keys, wherein said membrane switch circuit comprises a pressure detecting circuit for detecting said pressure, thereby generating a corresponding pressure-strength sensing voltage, wherein said pressure detecting circuit comprises plural pressure detecting elements, and each of said plural pressure detecting elements comprises a high-impedance detecting contact and a low-impedance detecting contact, wherein when one of said plural keys is depressed in response to a first pressure, said high-impedance detecting contact and said low-impedance detecting contact corresponding to said depressed key are contacted with each other to have a first contact area, so that said pressure detecting element has a first impedance value, wherein when one of said plural keys is depressed in response to a second pressure higher than said first pressure, said high-impedance detecting contact and said low-impedance detecting contact corresponding to said depressed key are contacted with each other to have a second contact area greater than said first contact area, so that said pressure detecting element has a second impedance value higher than said first impedance value, wherein said pressure detecting circuit further comprises a detecting resistor, which is grounded and has a detecting impedance value, wherein said plural pressure detecting elements are respectively connected with said detecting resistor in series, and said pressure detecting circuit generates said pressure-strength sensing voltage according to said detecting impedance value and said first impedance value or said second impedance value, wherein when said pressure detecting circuit generates a first pressure-strength sensing voltage according to said detecting impedance value and said first impedance value, said controlling unit judges that said depressed key is depressed in response to said first pressure;

an illumination module arranged between said base and said plural keys for emitting either a first light beam or a second light beam;

a controlling unit connected with said membrane switch circuit module and said illumination module for judging a strength of said pressure according to said pressure-strength sensing voltage, and controlling said illumination module to emit either said first light beam or said second light beam according to said strength of said pressure, wherein said controlling unit controls said illumination module to emit said first light beam, wherein when said pressure detecting circuit generates a second pressure-strength sensing voltage according to said detecting impedance value and said second impedance value, said controlling unit judges that said depressed key is depressed in response to said second pressure, and said controlling unit controls said illumination module to emit said second light beam.

2. The pressure sensitive and luminous keyboard according to claim 1 wherein said membrane switch circuit module comprises:

a first membrane circuit board having plural scan input lines, wherein said plural scan input lines have respective low-impedance input contacts; and a second membrane circuit board laminated with said first membrane circuit board, and having plural scan output lines, wherein said plural scan output lines have respective low-impedance output contacts, said plural scan output lines and said plural scan input lines crisscross to define a keyboard scanning matrix, and said low-impedance input contacts and said low-impedance output contacts of said keyboard scanning matrix collectively define plural intersection points corresponding to respective keys, wherein when a first key of said plural keys is depressed, a first low-impedance input contact of said plural scan input lines corresponding to said first key and a first low-impedance output contact of said plural low-impedance output contact corresponding to said first key are contacted with each other.

3. The pressure sensitive and luminous keyboard according to claim 1 wherein said illumination module comprises:

plural light emitting diodes arranged at bilateral sides of said plural keys for emitting either said first light beam or said second light beam; and a light guide plate laminated with said membrane switch circuit module for changing propagating directions of said first light beam and said second light beam, so that said first light beam and said second light beam are guided to enter said light guide plate in a first direction and leave said light guide plate in a second direction, wherein said first direction is parallel with said membrane switch circuit module, and said first direction and said second direction are perpendicular to each other.

4. The pressure sensitive and luminous keyboard according to claim 3 wherein said membrane switch circuit module is disposed on said light guide plate.

5. The pressure sensitive and luminous keyboard according to claim 3 wherein said light guide plate is disposed on said membrane switch circuit module, and comprises plural perforations.

6. The pressure sensitive and luminous keyboard according to claim 1 wherein each of said plural keys comprises:

a keycap exposed outside said base, wherein when said keycap is depressed, said sensing signal corresponding to said depressed key is generated;

a scissors-type connecting member connected with said keycap, so that the keycap is movable upwardly or downwardly within a travelling distance with respect to said base; and an elastic element disposed under said keycap, wherein when said keycap is depressed and moved downwardly with respect to said base, an elastic force is accumulated, wherein when said keycap is released, said elastic force is applied on said keycap, so that said keycap is moved upwardly with respect to said base.

7. The pressure sensitive and luminous keyboard according to claim 1 wherein said first light beam has a first light color, and said second light beam has a second light color.

8. The pressure sensitive and luminous keyboard according to claim 1 wherein said first light beam flickers at a first frequency, and said second light beam flickers at a second frequency, wherein said first frequency is lower than said second frequency.

* * * * *